(No Model.)
H. D. WILLIAMS.
GOVERNOR FOR WATER MOTORS.
No. 580,099.
Patented Apr. 6, 1897.
2 Sheets—Sheet 1.
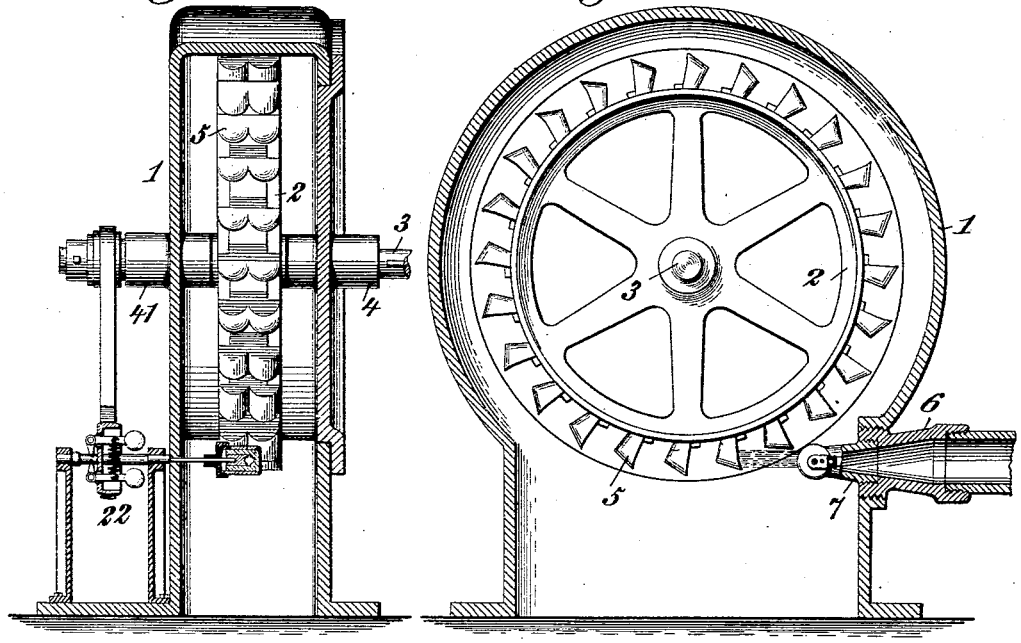
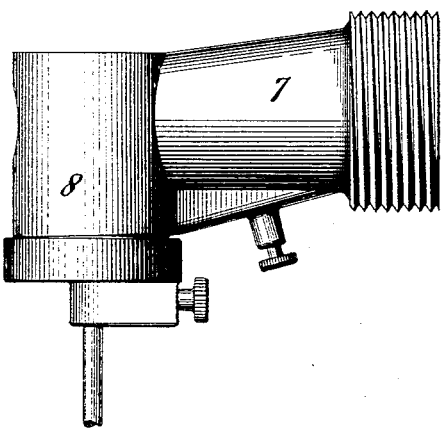
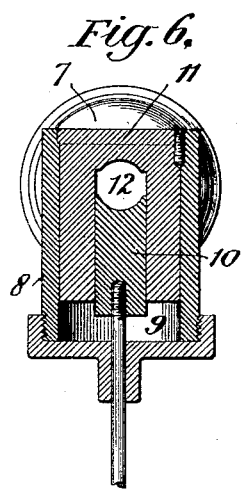
WITNESSES:
D. N. Hayward
W. Strunk, Jr.
INVENTOR
Harvey D. Williams
BY
E. M. Marble Vans
ATTORNEYS.

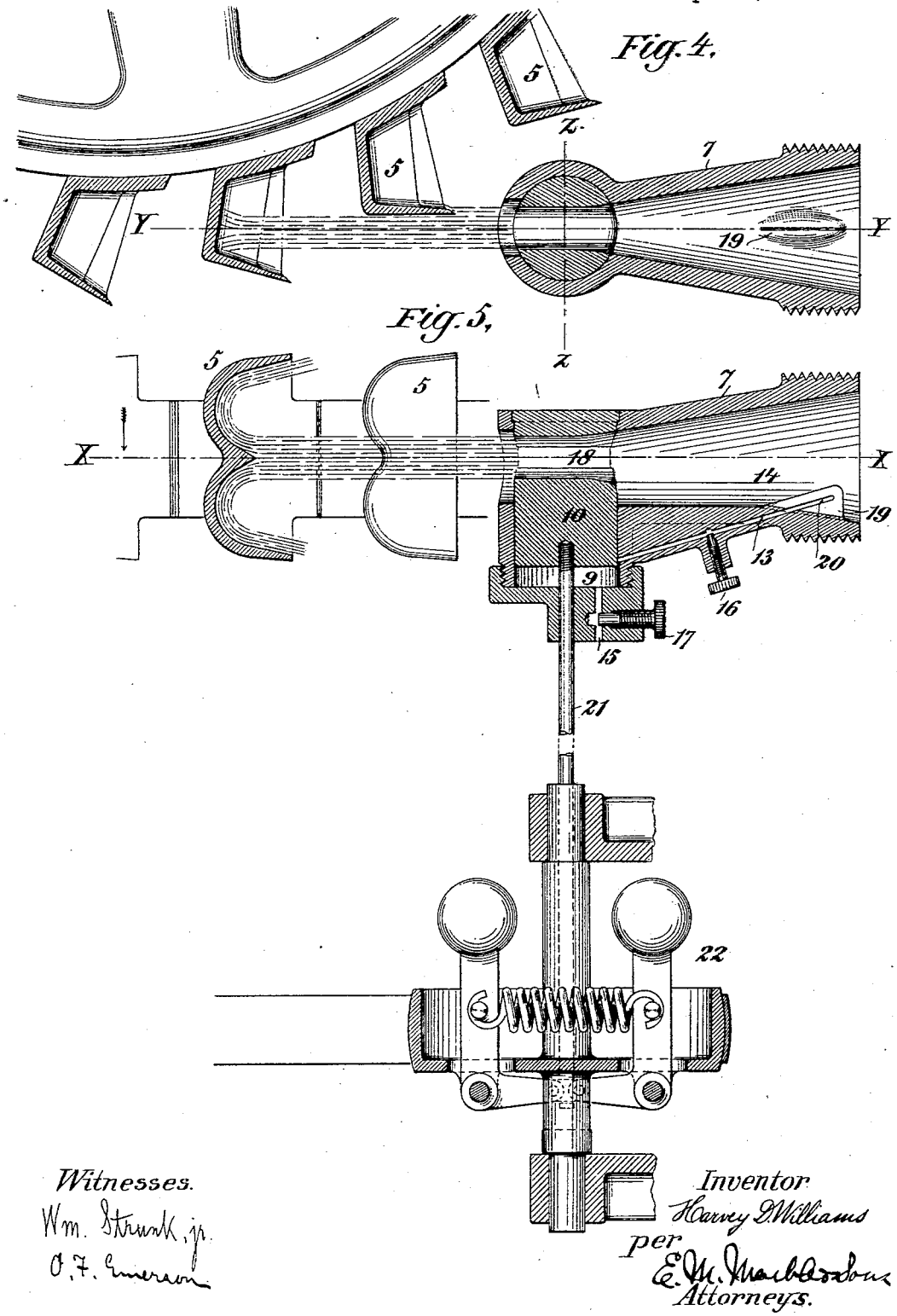

UNITED STATES PATENT OFFICE.

HARVEY D. WILLIAMS, OF ITHACA, NEW YORK.

GOVERNOR FOR WATER-MOTORS.

SPECIFICATION forming part of Letters Patent No. 580,099, dated April 6, 1897.

Application filed March 13, 1896. Serial No. 583,125. (No model.)

*To all whom it may concern:*

Be it known that I, HARVEY D. WILLIAMS, a citizen of the United States, residing at Ithaca, in the county of Tompkins and State of New York, have invented certain new and useful Improvements in Governors for Water-Motors; and I do hereby declare the following to be a full, clear, and exact description of the invention, such as will enable others skilled in the art to which it appertains to make and use the same.

My invention relates to governors for water wheels or motors employed for regulating the speed of the wheel and maintaining constant speed under varying conditions of load or water-pressure; and my invention is particularly applicable to water wheels or motors of the Pelton class.

My invention consists in the novel form of regulating-valve used for regulating the speed of a water-wheel, in the novel means provided for balancing said valve, in the novel means provided for regulating the movement thereof and preventing too rapid movement, and in the novel combination, construction, and arrangement of the parts.

The invention herein illustrated is a modification of another governor for water-wheels forming the subject-matter of a separate application for Letters Patent filed March 13, 1896, Serial No. 583,124. In said governor there is employed a balanced regulating-valve, the movement of which is controlled by an auxiliary valve controlling the pressure within a hydraulic cylinder, the auxiliary valve being operated by a fly-ball governor driven from the crank-shaft of the water-wheel. In the governor herein described the auxiliary valve is dispensed with and the regulating-valve is directly connected with and operated by a fly-ball governor, the hydraulic chamber being retained to balance the valve, so that but little power shall be required to move it and to prevent too rapid movement of the valve, which might cause overgoverning.

The objects of my invention are, first, to provide a governor for water wheels and motors which shall be more delicate and rapid in its operation and shall more perfectly control the speed of the wheel than governors heretofore used; second, to provide a governor in which the rate of opening or closing of the valve or gate may be regulated, so that overgoverning or undergoverning may be prevented; third, to provide a governor which may be adjusted to maintain different speeds of the water wheel or motor, and, fourth, to provide a governor which shall be extremely simple, compact, durable, easily regulated and adjusted, and as inexpensive as possible. These objects are attained in the governor herein described, and illustrated in the drawings which accompany and form a part of this application, in which the same reference-numerals indicate the same or corresponding parts, and in which—

Figure 1 is a side elevation of a water-wheel of the Pelton type, the inclosing case of the water-wheel being sectioned to show the bucket-wheel and nozzle. Fig. 2 is an end elevation of the water-wheel, a portion of the end of the inclosing case being broken away to show the position of the nozzle therein, the nozzle also being sectioned through the center of the valve. Fig. 3 is a top view of the nozzle. Fig. 4 is an elevation of the lower portion of the bucket-wheel and of the nozzle, the buckets and the nozzle being sectioned upon the line X X of Fig. 5. Fig. 5 is a horizontal section of the nozzle and of the fly-ball governor by which the regulating-valve is operated upon the line Y Y of Fig. 4, one of the bucket-wheels being likewise sectioned; and Fig. 6 is a transverse vertical section of the nozzle, taken through the center of the regulating-valve upon the line Z Z of Fig. 4.

In the drawings, 1 is the case, surrounding and inclosing the bucket-wheel.

2 is the bucket-wheel, mounted upon a driving-shaft 3, which rotates in bearings 4 4 of the case 1.

5 5 are cup-shaped buckets of the type usually used in Pelton water-wheels, mounted upon the periphery of the bucket-wheel.

6 is a supply-pipe through which water is supplied to the water-wheel and which screws into the inclosing case 1. In its inner end is a nozzle 7, having a tapering bore, and which is provided with a regulating-valve (particularly shown in Figs. 3, 5, and 6) by which the size of the jet of water issuing from the nozzle may be regulated. The jet from the nozzle 7 impinges upon the buckets 5 5 successively, imparting the energy due to its velocity to the bucket-wheel 2, and thus causing said wheel to revolve. When its velocity has thus been imparted, the water falls from the bucket into the discharge-passage in the bottom of the case 1. The valve contained within the nozzle 7 is operated by a fly-ball governor of ordinary construction driven by a belt from the driving-shaft 3.

The nozzle 7 is provided with a boss 8 upon one side, which contains the parts of the regulating-valve. Within this boss is a valve-chamber 9, within which slides a valve-plate 10, by which the size of the stream issuing from the nozzle is regulated. For convenience in construction the boss 8 may be bored cylindrically through its whole length and one end of the valve-chamber thus formed closed by a cylindrical plug or cap 11, having within it a central slot or passage 12, through which the jet passes and in which the valve 10 slides. The nozzle 7 contains a small water-passage 13, connecting the bore of the nozzle in the portion 14 in rear of the restricted portion of the bore formed by the valve 10 with the valve-chamber 9 behind the valve 10. In the bottom of the valve-chamber 9 is a second and preferably larger waste-passage 15. The flow of water through these water-passages, and therefore the pressure in the chamber 9, may be regulated by valves 16 and 17, by which these passages may be restricted, as desired. The pressure in the chamber 9 may be varied by opening or closing either of the valves 16 and 17 without changing the adjustment of the other; but the use of the two valves permits a delicacy of adjustment of the regulator. Opening of the valve 16 causes the regulating-valve 10 to close more quickly, and opening the valve 17 causes the regulating-valve to open more rapidly. The use of both of the valves 16 and 17 is therefore preferable. The water-pressure within the chamber 9, acting upon the rear face of the valve 10, tends to balance the pressure exerted upon the front face of the valve by the water passing through the contracted portion 18 of the nozzle, and does so partly or completely, according to the adjustment of the screws 16 and 17. Since the water-pressure in the portion 14 of the bore of the nozzle is greater than in the contracted portion 18, if the screw 17 completely closed the waste-passage 15 the pressure of the water in the valve-chamber 9 upon the rear face of the valve 10 would be greater than the water-pressure upon the front face of the valve, so that by adjusting the flow of water into and out of the valve-chamber 9 the pressure is balanced partly or completely, as desired.

In order to prevent sediment from entering the slot 13 and stopping up the same, I cover the entrance to this opening with a V-shaped cap or strainer 19, so shaped as to afford as little resistance as possible to the passage of the water through the nozzle and which has in its sides a slot 20, forming a continuation of the passage 13 and through which the water may pass into this passage 13.

The valve 10 is connected by a rod 21, passing through the rear end of the valve-chamber 9, with an ordinary fly-ball governor 22, driven from the main shaft of the water-wheel. The form of fly-ball governor shown is one of many suitable forms commonly used, and no description of this governor is deemed to be necessary. The governor is arranged to push the valve 10 inward when the speed of the water-wheel rises higher than the desired speed and to pull the valve 10 outward when the speed of the water-wheel falls below the desired speed.

The valve-chamber 9, besides balancing the valve 10, acts to prevent too rapid movement of the valve or sudden fluctuations thereof. The valve can move backward only as the water escapes through the waste-passage 15. It can move forward only as water is drawn in through the passage 13 or air through the passage 15. Overgoverning of the water-wheel is thereby prevented and the rate of movement of the valve placed under control.

The governor may be adjusted to maintain any desired speed of the water-wheel by properly proportioning the fly-balls or the strength of the springs of the centrifugal governor or in any other manner commonly used for adjusting centrifugal governors for different speeds.

Having thus completely described my invention, what I claim, and desire to secure by Letters Patent, is—

1. In a regulator for water-wheels, the combination, with a valve arranged to move across the supply-passage of the water-wheel and so to restrict the flow of water through said passage, of a balance-chamber in which said valve moves, means for admitting fluid under pressure to said chamber in rear of said valve, a pressure-varying device by which the pressure in said chamber may be adjusted, a valve-rod connected with said valve, and a governor driven by the water-wheel and connected to said valve-rod, and arranged to open and close said valve as the speed of the wheel varies, substantially as described.

2. In a regulator for water-wheels, the combination, with a regulating-valve arranged to move across the supply-passage of the water-wheel and so to restrict the flow of water through said passage, of a balance-chamber in which said valve moves, an admission-passage for admitting fluid under pressure to said chamber in rear of said valve, a waste-passage communicating with said chamber, other valves for regulating the passage of fluid through the admission and waste passages, a valve-rod connected with said regulating-valve, and a governor driven by the water-wheel and connected to said valve-rod, and arranged to open and close the regulating-valve as the speed of the wheel varies, substantially as described.

3. In a water-wheel, the combination, with a series of buckets revolubly mounted, a nozzle arranged to project a jet of water into said buckets, successively, a valve-chamber in communication with the bore of the nozzle, and a valve in said chamber adapted to move across the bore of the nozzle and so to restrict the flow of water therethrough, of an admission-passage connecting the valve-chamber in rear of said valve with the bore of the nozzle, a waste-passage communicating with said chamber, a pressure-varying device by which the pressure in said chamber may be adjusted, a valve-rod connected with said valve, and a governor driven by the water-wheel and connected to said valve-rod, and arranged to open and close said valve as the speed of the wheel varies, substantially as described.

4. In a water-wheel, the combination, with a series of buckets revolubly mounted, a nozzle arranged to project a jet of water into said buckets successively, a valve-chamber in communication with the bore of the nozzle, and a regulating-valve in said chamber adapted to move across the bore of the nozzle and so to restrict the flow of water therethrough, of an admission-passage connecting the valve-chamber in rear of said valve with the bore of the nozzle, a waste-passage communicating with said chamber, other valves for regulating the flow of water through said admission and waste passages, a valve-rod connected with said regulating-valve, and a governor driven from the shaft of the water-wheel and connected to said valve-rod, and arranged to open and close the regulating-valve as the speed of the wheel varies, substantially as described.

5. In a water-wheel, the combination, with a series of buckets revolubly mounted, a nozzle arranged to project a jet of water into said buckets successively, a boss projecting from said nozzle and having within it a valve-chamber in communication with the bore of the nozzle, a cap closing the end of said valve-chamber, and a valve therein adapted to move across the bore of the nozzle and so to restrict the flow of water therethrough, of an admission-passage in said nozzle connecting the valve-chamber in rear of said valve with the bore of the nozzle, a waste-passage in the end cap of said boss communicating with the valve-chamber, a valve-rod passing through said cap and connected to the valve, and a centrifugal governor driven from the shaft of the water-wheel and connected to said valve-rod, and arranged to open and close said valve as the speed of the wheel varies, substantially as described.

In testimony whereof I affix my signature in presence of two witnesses.

HARVEY D. WILLIAMS.

Witnesses:
  W. STRUNK, Jr.,
  O. F. EMERSON.